United States Patent [19]

Salvaneschi

[11] Patent Number: 5,588,871
[45] Date of Patent: Dec. 31, 1996

[54] TERMINAL BOX FOR HERMETIC COMPRESSORS

[75] Inventor: Marco Salvaneschi, Barona di Albuzzano, Italy

[73] Assignee: Necchi Compressori S.r.l., Pavia, Italy

[21] Appl. No.: 436,595

[22] Filed: May 8, 1995

Related U.S. Application Data

[63] Continuation of Ser. No. 145,162, Nov. 3, 1993, abandoned.

[30] Foreign Application Priority Data

Nov. 3, 1992 [IT] Italy .................. PV92U0011

[51] Int. Cl.$^6$ ............................. H01R 13/58
[52] U.S. Cl. ............................. 439/469
[58] Field of Search ............................. 439/460, 464, 439/469, 470–472

[56] References Cited

U.S. PATENT DOCUMENTS

| | | | |
|---|---|---|---|
| 3,355,702 | 11/1967 | Mundschenk et al. | 439/545 |
| 4,025,142 | 5/1977 | Huber et al. | 439/567 |
| 4,077,693 | 3/1978 | Briel, Jr. et al. | 439/545 |
| 4,352,538 | 10/1982 | Kowler | 439/545 |
| 4,842,550 | 6/1989 | Fry, Jr. et al. | 439/464 |
| 5,055,066 | 10/1991 | Garretson | 439/464 |
| 5,360,352 | 11/1994 | Rudy, Jr. et al. | 439/469 |

FOREIGN PATENT DOCUMENTS 353539  2/1990  European Pat. Off. .............. 439/470

Primary Examiner—Gary F. Paumen
Attorney, Agent, or Firm—Watson Cole Stevens Davis, P.L.L.C.

[57] ABSTRACT

A terminal box for a hermetic compressor for connecting electrically the feeding lines to electrical components of a refrigerator casing and the compressor and suitable for coupling to a plate fixed to the compressor, comprising a body, seats formed in an upper pan of the body for housing terminals for feeding lines, a clamp in a lower part of the body for fixing the lines to the body, a cover for covering the body, a snap catch for elastically fixing the body to the plate and a snap catch for elastically fixing the cover to the plate.

5 Claims, 3 Drawing Sheets

TERMINAL BOX FOR HERMETIC COMPRESSORS

This application is a continuation of application Ser. No. 08/145,162, filed Nov. 3, 1993, now abandoned.

BACKGROUND OF THE INVENTION

The present invention relates to a terminal box for hermetic compressors used for domestic refrigerators or for other applications which comprise a hermetic compressor.

Nowadays there are various ways and means to connect the terminal box to its compressor. The functions to be executed by the terminal box are on the one hand to receive the electric feeding line and the internal cablage and on the other hand to protect the components (starter and temperature relay) provided for starting and for electrical security.

During the installation phase, the hermetic compressor is connected, without terminal box-starter-temperature relay, to the refrigerator circuit by means of the welding of the suction and discharge lines, afterwards the operator installs the starter, the temperature relay and the terminal box in suitable seats near the compressor.

As the compressor must not jut outside of the refrigerator casing, the seats for the starter, the temperature relay and the terminal box are positioned in such a way that they are between the compressor and one of the two refrigerator casing's lateral walls. In such a disposition the operator locates the terminal box between the lateral wall and the compressor, inserting it in a suitable seat and moving it from the lateral wall toward the compressor. It is thus easily comprehensible that the free space between the compressor and the lateral wall must be enough so that it is possible to insert the electrical accessories first, that is the starter and the temperature relay, and then the terminal box. This requires a smaller utilizable space inside the refrigerator casing and if two compressors are used, for example when a freezer and a refrigerator are combined in the same casing but using two separate refrigerating circuits, this problem becomes even greater. In fact, in the combined application, it is necessary to use two compressors and terminal boxes of smaller dimensions or to increase the external volume of the casing.

Another drawback of the known terminal boxes is caused by the fact that, the line-pressers fixing the feeding and internal cablage lines are formed by small plastic junctions which press the lines against the terminal box by means of fixing screws. The line cablage and fixing operation in narrow and hardly reachable spaces for the operator require a considerable time for locating the compressor in the refrigerator casing.

Further, if the line-pressers are unbound and detached from the terminal box, and it is the same for the fixing screws, the difficulties are increased because it is necessary to handle small components. A further drawback of the known terminal boxes is that, when they are positioned on the compressor and the various electrical connections are fastened, it is necessary to protect the parts under tension by means of a plastic cover which is fixed to the terminal box by a spring or by screws. Also this operation results in difficulty for the above-mentioned reasons.

In order to complete the citation of the known art it is necessary not to forget that the management of the above-mentioned components (terminal box, terminal box cover, fixing spring or screw, line pressers, line presser screws and so on) is very complicated and expensive, as it involves the whole assembly process from beginning to end.

SUMMARY OF THE INVENTION

It is the object of the present invention to overcome the above described drawbacks in the various phases, from the supplying to the storage, the forwarding and the final installation at the customer's place of installation.

The technical problem to be solved is the realization of a simple terminal box, easily connectable to the compressor, with a minimum volume, and which provides a quick fixing of the feeding line cover without using screws and springs and in which the separate components to be handled are as few as possible.

The solution of the technical problem is characterized by the fact that the terminal box comprises a body in the upper part of which seats are made for the housing of the terminals receiving the feeding lines and in the lower part of said body, elements are positioned for fixing said lines to said terminal box, a cover for closing said body, means being provided for elastically fixing said body to a plate and means for elastically fixing said cover to said plate.

BRIEF DESCRIPTION OF THE DRAWINGS

Further characteristics and advantages will become more clearly apparent by the following description and the enclosed drawings in which.

DESCRIPTION OF THE PREFERRED EMBODIMENTS

Figure 1:
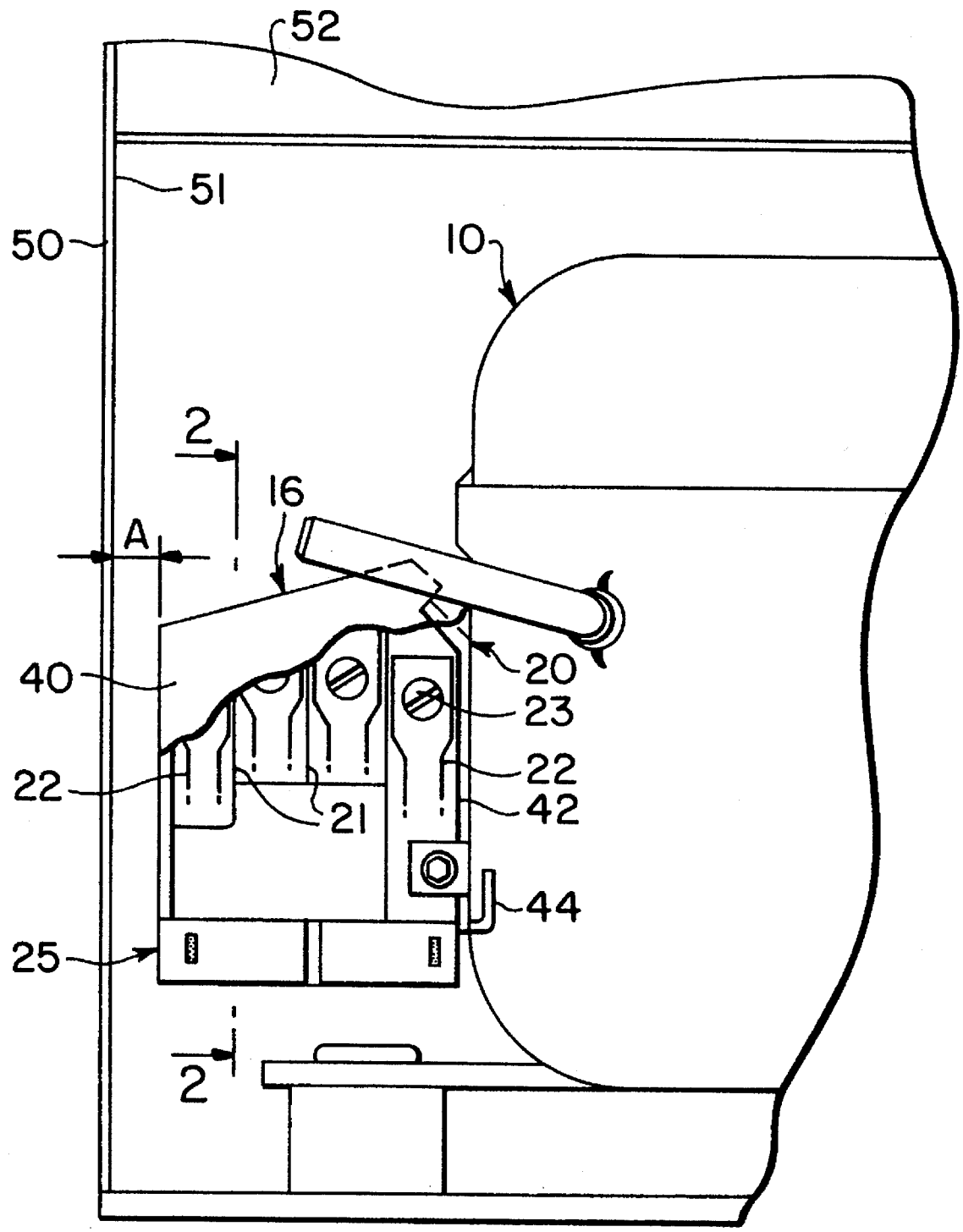
FIG. 1 illustrates a hermetic compressor to which the terminal box of the present invention is applied.
Figure 2:
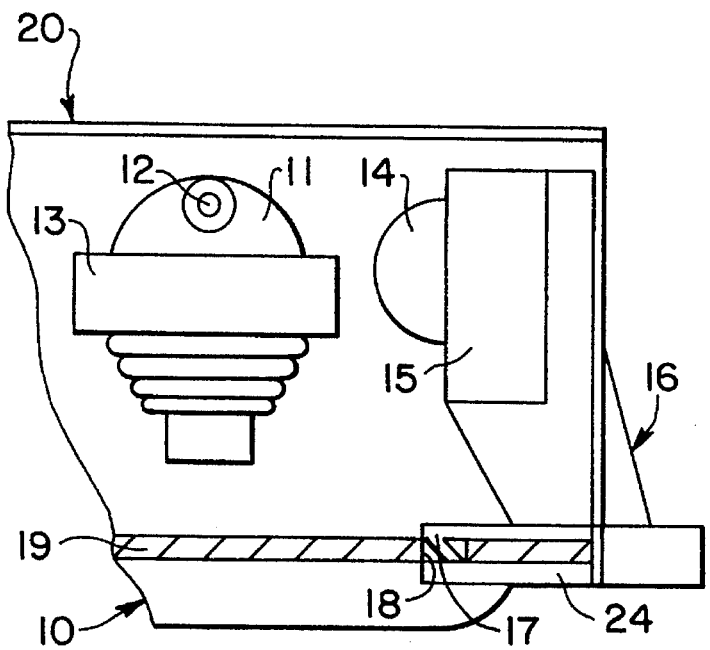
FIG. 2 is a sectional view along line 2—2 of FIG. 1.

With reference to FIGS. 1 and 2 the shell of a motorcompressor has been generally indicated by 10. A fusite connector 11 is used for the electrical feeding of the motor. The connector II is provided with three plugs 12 (not all shown) to two of which a magnetic starter 13 is fixed while to the third a thermical protector 14 is connected by a line not shown. The protector 14 is supported by a body 15 which forms a part of the terminal box 16 which is an object of the present invention. The body 15 is fixed to the compressor 10 by means of sliding fixing elastic elements 17 into slots 18 made in the horizontal portion 19 of a plate 20 fixed to the compressor 10. The fixing elastic elements 17 are at least two in number in order to assure a steady positioning of the terminal box 16 i.e., preventing it from moving laterally. The terminal box 16 is guided into its operating position on the compressor 10 by sliding horizontally the body 15, elastic elements 17 and horizontal plate 24 parallel to elastic elements 17 over a portion 19 of the plate 20.

In the body 15 of terminal box 16 seats 21 are formed in which terminals 22 are located (FIG. 1) having screws 23 which fix the ends of the feeding lines to the terminals 22. The terminals 22 are connected through faston-type connections to the electrical components of the refrigerator casing and of the compressor.

Figure 5:
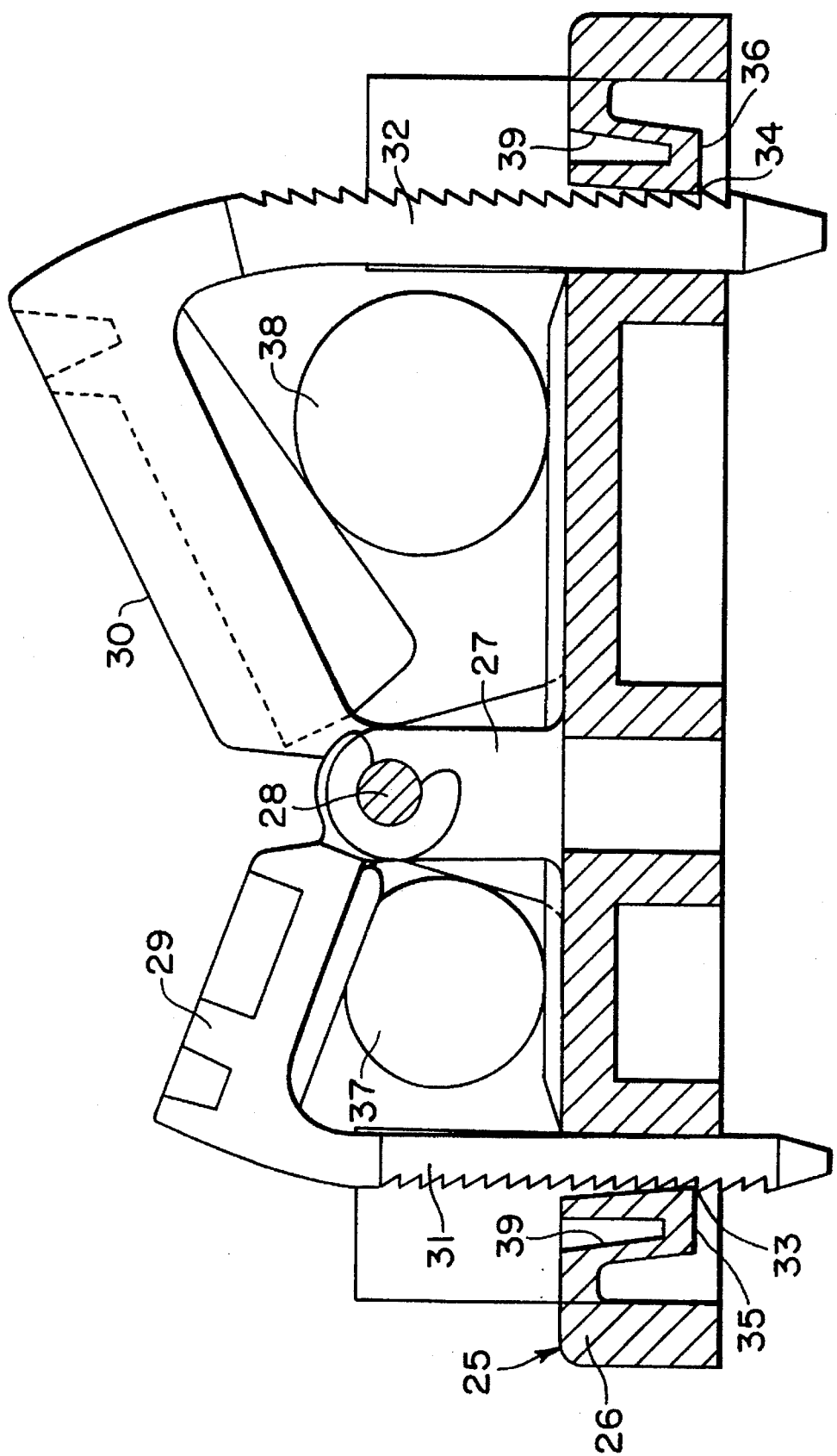
FIG. 5 illustrates a detail of the terminal box.

In order to prevent the feeding lines from being accidentally detached from the terminals 22 the feeding lines are kept in position by a line presser 25 (FIGS. 1 and 5) which is positioned in the body 15 of the terminal box 16 and is formed by a plate 26 having a projection 27. The projection 27 is provided with a pivot 28 to which two little blocks 29 and 30 are elastically fixed and free to rotate around the pivot 28. The little blocks 29 and 30 present respectively tongues 31 and 32 having saw-toothed portions which lock with teeth 33 and 34 respectively of surfaces 35 and 36 of the plate 26 when the little blocks 29 and 30 are in the operative position to lock the feeding lines 37 and 38. If the feeding lines 37 and 38 must be detached for executing a check or for repairing the refrigerator, the operator, by means of a tool such as a screw-driver, inserts the screw-driver end in suitable seats 39 in order to separate the teeth 33 and 34 from the saw-toothed portion of the tongues 31 and 32 respectively.

Figure 4:
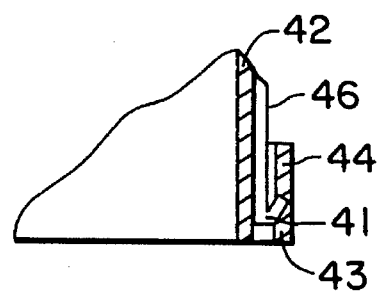
FIG. 4 illustrates a vertical sectional detail of FIG. 1.
Figure 3:
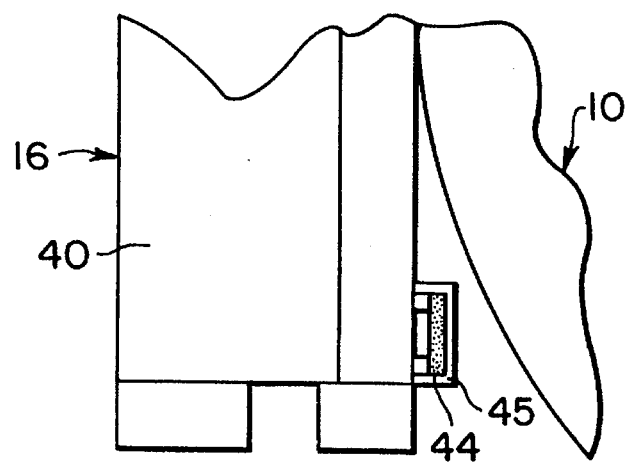
FIG. 3 illustrates a top plan view of a portion of FIG. 1.

In this way the lines 37 and 38, are freed from blocks 29 and 30 and the plate 26, and can be removed. The magnetic starter 13, the protector 14 and the body 15 are closed by a cover 40 (FIG. 1, 3 and 4) which is held to the outside of vertical side 42 of the plate 20 by means of an elastic element 41 fixed into slot 43 of projection 44. Element 41 is attached to the outside of vertical side 46 of cover 40. Projection 44 is used also as a guide for the cover 40 to keep it in the correct position when it covers the body 15.

Guide 45 fits over projection 44.

In order to position and clasp the body 15 to the plate 20 it is sufficient (FIG. 1) to cause said body to translate parallely to the vertical wall 50 of the space 51 of the refrigerator casing 52 in which the compressor 10 is positioned.

For positioning the cover 40 to close the body 15 it is sufficient to let said cover 40 translate vertically to clasp the plate 20.

In such a way the distance A between the terminal box 16 and the vertical wall 50 of the space 51 is very limited so that there is a larger useful space inside the refrigerator casing. By the fixing system of the terminal box 16 to the plate 20 and by the line-presser above described, all the small accessories (screws, springs, washers and so on) used in the known technique are eliminated.

I claim:

1. A terminal box for a hermetic compressor for connecting electrically feeding lines to electrical components of a refrigerator casing and the compressor and suitable for coupling to a first plate fixed to the compressor, comprising a body, seats formed in an upper part of said body for housing terminals of said feeding lines, locking means in a lower part of said body for fixing said lines to said body and a cover for covering said body, said body having elastic means for removably elastically fixing said body to said first plate and said cover having elastic means for removably elastically fixing said cover to said first plate, said cover being removable from said body while said body remains fixed to said first plate, said locking means for fixing said lines being composed of a second plate having a projection provided with a pivot, two blocks pivotally mounted on said pivot, each said block having an elastic tongue, means on said second plate capable of coupling said elastic tongues with said second plate.

2. The terminal box according to claim 1, wherein said means on said second plate has a tooth and each elastic tongue has saw teeth engageable with a tooth.

3. The terminal box according to claim 2, wherein said second plate has seats thereon engageable by a tool which tool by pivoting disengages a tooth from the saw teeth of the tongue.

4. The terminal box according to claim 1, wherein said elastic means on said body comprise at least one elastic element, said at least one elastic element fixing said body to said first plate by a translation in only one direction of said terminal box when the compressor is in the refrigerator casing.

5. The terminal box according to claim 1 wherein said elastic means on said cover comprise at least one elastic element for fixing said cover to said first plate by a translation in only one direction of said cover when said cover covers said body.

* * * * *